United States Patent
Plotnik et al.

(10) Patent No.: US 10,148,639 B2
(45) Date of Patent: Dec. 4, 2018

(54) DISTINGUISHING VERTICAL BRUTE FORCE ATTACKS FROM BENIGN ERRORS

(71) Applicant: Microsoft Technology Licensing, LLC., Redmond, WA (US)

(72) Inventors: Idan Plotnik, Savion (IL); Michael Dolinsky, Netanya (IL); Sivan Krigsman, Hertzliya (IL); Tal Arieh Be'ery, Petach Tikva (IL); Gil David, Zichron Yaakov (IL); Marina Simakov, Ashdod (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 197 days.

(21) Appl. No.: 15/163,633

(22) Filed: May 24, 2016

(65) Prior Publication Data

US 2017/0346809 A1    Nov. 30, 2017

(51) Int. Cl.
*H04L 29/06* (2006.01)
*G06F 21/31* (2013.01)
*G06F 21/55* (2013.01)
*G06F 21/45* (2013.01)

(52) U.S. Cl.
CPC .......... *H04L 63/0815* (2013.01); *G06F 21/31* (2013.01); *G06F 21/554* (2013.01); *H04L 63/0428* (2013.01); *H04L 63/061* (2013.01); *H04L 63/083* (2013.01); *H04L 63/12* (2013.01); *H04L 63/123* (2013.01); *H04L 63/145* (2013.01); *H04L 63/1441* (2013.01); *G06F 21/45* (2013.01); *G06F 2221/2135* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,291,472 B2 | 10/2012 | Bak et al. | |
| 8,412,931 B2 | 4/2013 | Vedula et al. | |
| 8,707,440 B2 | 4/2014 | Gula et al. | |
| 9,213,813 B2 | 12/2015 | Komatsu | |
| 2005/0216955 A1 | 9/2005 | Wilkins et al. | |
| 2007/0079116 A1 | 4/2007 | Johnson | |

(Continued)

OTHER PUBLICATIONS

"International Search Report and Written Opinion Issued in PCT Application No. PCT/US2017/032995", dated Aug. 25, 2017, 17 Pages.

(Continued)

*Primary Examiner* — Brandon S Hoffman
(74) *Attorney, Agent, or Firm* — Merchant & Gould

(57) ABSTRACT

Brute force attacks on a given account with various password attempts are a common threat to computer security. When a suspected brute force on an account is detected, systems may lock the account from access, which is frustrating to users and time consuming for administrators in the event of a false positive. To reduce the number of false positives, brute force counterattacks are taught in the present disclosure. A brute force counterattack is used to learn whether the login attempts change the passwords attempted, and are to be classified as malicious, or keep the attempted password the same in multiple attempts, and are to be classified as benign.

20 Claims, 7 Drawing Sheets

(56) References Cited

U.S. PATENT DOCUMENTS

| | | | |
|---|---|---|---|
| 2013/0232562 A1* | 9/2013 | Rodriguez | G06F 21/32 726/5 |
| 2015/0110273 A1* | 4/2015 | Ponceleon | H04L 9/0816 380/277 |
| 2016/0057169 A1 | 2/2016 | Honda et al. | |

OTHER PUBLICATIONS

Balzarotti, et al., "Research in Attacks, Intrusions and Defenses", In Publication of Springer, Aug. 15, 2012, 1 page.

Sullivan, Bryan, "Preventing a Brute Force or Dictionary Attack: How to Keep the Brutes Away from Your Loot", Published on: Feb. 20, 2008 Available at: http://www.testingstuff.com/articles/Brute Force and Dictionary Attacks Article.html.

Burnett, Mark, "Blocking Brute Force Attacks", Published on: Sep. 11, 2006 Available at: https://www.cs.virginia.edu/~csadmin/gen_support/brute_force.php.

"Account lockout threshold", Retrieved on: Mar. 10, 2016 Available at: https://technet.microsoft.com/en-in/library/hh994574.aspx.

"Stop Brute Force Attacks", Published on: Feb. 12, 2015 Available at: https://sucuri.net/website-firewall/stop-brute-force-attacks.

"Throttling login attempts", Published on: Mar. 18, 2009 Available at: http://stackoverflow.com/questions/570160/throttling-login-attempts.

"Microsoft NTLM", Retrieved on: Mar. 11, 2016 Available at: https://msdn.microsoft.com/en-us/library/windows/desktop/aa378749(v=vs.85).aspx.

"THC Hydra", Retrieved on: Mar. 11, 2016 Available at: http://sectools.org/tool/hydra/.

Gamache, Mark, "Mark Gamache's Random Blog", Published on: Jan. 8, 2013 Available at: http://markgamache.blogspot.in/2013/01/ntlm-challenge-response-is-100-broken.html.

"LM hash", Retrieved on: Mar. 11, 2016 Available at: https://en.wikipedia.org/wiki/LM_hash.

"Code Page", Retrieved on: Mar. 11, 2016 Available at: https://en.wikipedia.org/wiki/Code_page.

"NT LAN Manager", Retrieved on: Mar. 11, 2016 Available at: https://en.wikipedia.org/wiki/NT_LAN_Manager.

"3.3.1 NTLM v1 Authentication", Retrieved on: Mar. 11, 2016 Available at: https://msdn.microsoft.com/en-us/library/cc236699.aspx.

* cited by examiner

DISTINGUISHING VERTICAL BRUTE FORCE ATTACKS FROM BENIGN ERRORS

BACKGROUND

Malicious parties often seek to gain access to systems through a variety of means, including brute force attacks. Brute force attacks may be horizontal, in which the malicious party attempts to compromise the accounts of multiple legitimate users; vertical, in which the malicious party attempts to compromise the account of one legitimate user multiple times; or include both horizontal and vertical attacks. When a malicious party attempts to gain access to a system using vertical brute force attacks, multiple passwords are tried in combination with a username (or a suspected username) for an account; often associated with an administrator or high level user. Vertical brute force attacks are often made in rapid succession by a machine controlled by the malicious party to quickly try several suspected passwords against a username.

To combat these attacks, an administrator of the system may set rules by which an account is "locked" after a specified number of login attempts, and will not allow anyone to access the account until it is unlocked by the administrator. Unfortunately, the rules for account locking may also be triggered by benign errors. For example, a user may set a program to automatically login to the system, but forget to update a password in the program after a password change (or otherwise supply the wrong password), causing the program to lock legitimate users out of their own accounts. Locking users out of their own accounts does not improve the security of the system, and may eventually lead to weakened security for the system if the accounts are locked too frequently, due to users bypassing security and ignoring good security practices out of frustration and administrator time constraints.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling the distinguishing of brute force attacks from benign errors in accessing a system. The present disclosure is applicable to security protocols with known vulnerabilities and to those without known vulnerabilities. The systems and methods of the present disclosure are operable to determine whether a login attempt is part of a series of benign errors or a brute force attack based on the passwords used, without having to know the password itself or actively applying attempts to a secondary or dummy authentication system. In various aspects, it will be determined whether the same attempted-password is being used repeatedly, indicating a benign error, or different attempted-passwords are being used in series, indicating a brute force attack.

Systems use security protocols that yield different encrypted results for multiple transmissions using the same password to prevent eavesdroppers from learning a password or details about the system over multiple transmissions. The different encrypted results for a given password are achieved in different protocols by adding a timestamp or other nonce to be encrypted with the password, by issuing challenges to the requesting machine, and other methods. A passive observer, such as an eavesdropper or monitoring device, as a result of the unique encryptions for each attempt, is normally unable to determine whether the same password has been used in each attempt. However, the passive observer may learn that the passwords transmitted are the same or different between attempts, without needing to learn what the attempted-password actually was, by using various brute force attacks on the transmissions.

In aspects where a known vulnerability allows an observer to learn at least one bit from the attempted-password, several of the attempts are brute-forced to reveal the hash of the login-attempt. If the vulnerable bit(s) revealed differ among the several revealed hashes, it will be determined that the attempted-password has changed in the login attempts, and therefore the attempts are determined to be part of a brute force attack, and the account may be locked, access may be selectively disabled to sensitive systems or files, or the account may be flagged for further manual review by security/administrative personnel (collectively referred to as "locking" or "securing" an account). As will be appreciated, the number of attempts that are brute-forced will be at least two so that a comparison can be made between attempts, but greater certainty in whether the login attempts represent benign errors or a brute force attack can be realized by brute-forcing more of the attempted-passwords.

In aspects without a known vulnerability being exploited, a dictionary of likely attempted-passwords is used to derive authentication keys to the system. These authentication keys may be computed beforehand or at the time of attack, and are used to attempt to decrypt an encrypted value of the first several messages of the suspected vertical brute force attack. If one of the authentication keys succeeds in decrypting one encrypted message, but not all of the encrypted messages, it will be determined that the messages are part of a brute force attack, and the account may be locked.

By providing administrators with the ability to distinguish between brute force attacks and benign errors, the present disclosure addresses a computer-centric problem and improves the efficiency and reliability of the systems themselves.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
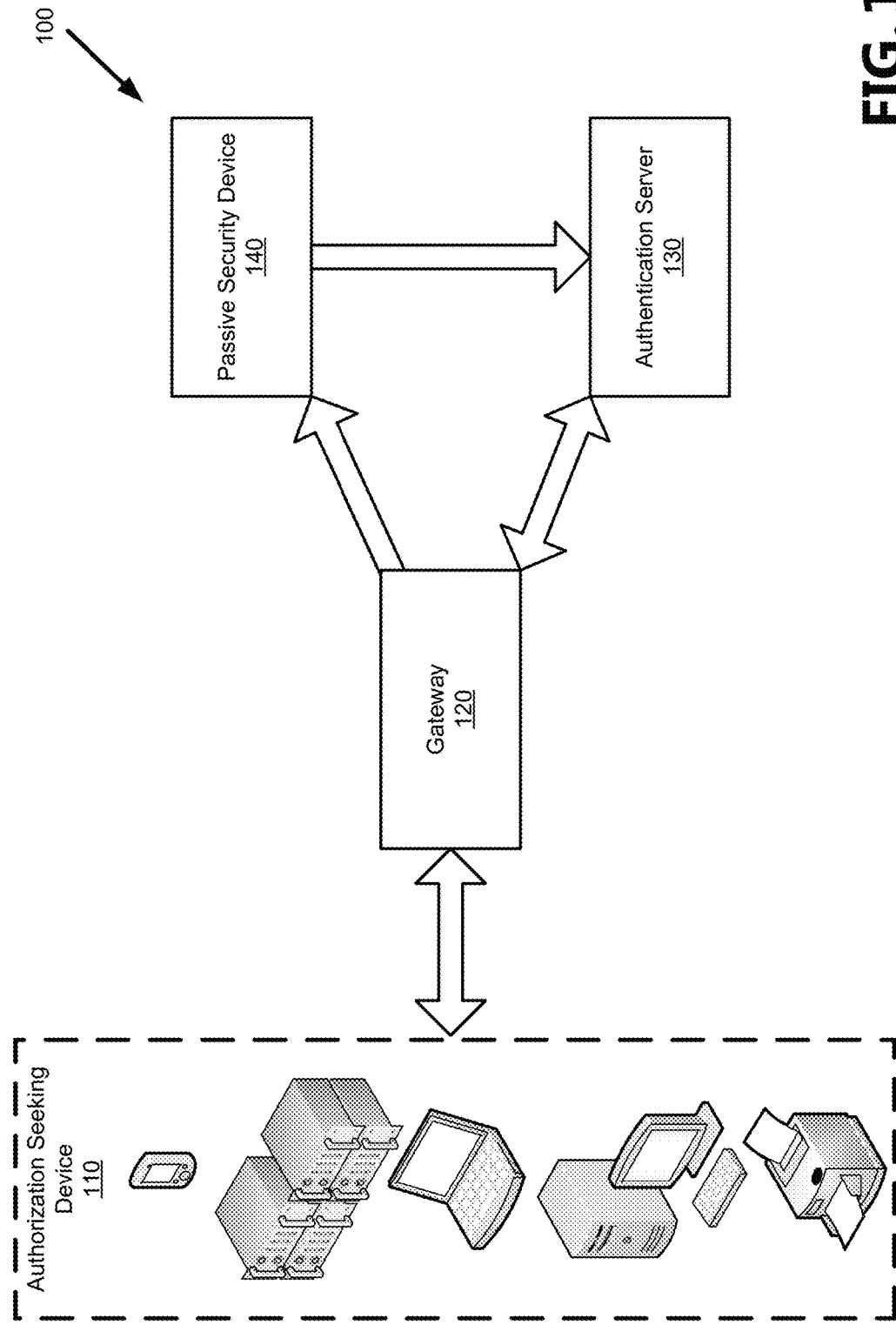
FIG. 1 illustrates an example environment in which authorization requests are handled by a system from various requesting devices.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

A vertical brute force attack attempts to gain access to an account hosted by a system by trying several different passwords in succession until access is gained. Many authorization granting systems include safeguards that would see these attempts at login repeatedly fail, due to the incorrect password being used, and may lock the user's account (e.g., prevent access from being granted to the account, disable access to sensitive systems or files by the account, flag the account for further manual review) to protect it against a potential attack after a given number of attempts. However, malicious vertical brute force attacks and benign login errors can look the same to an authorization granting system. For example, a benign login error may occur when a user inputs a password incorrectly (or fails to update a password) in a program or application, which may then attempt to connect to a system repeatedly using the improper password. The authorization granting system would see the repeated login attempts from the program, and falsely identify the benign error as a vertical brute force attack. The safeguards in the system could then lock users out of their own accounts in addition to guarding against malicious parties attempting to gain unauthorized access to the accounts in question.

Users who are locked out of their own accounts are dependent on administrators unlocking those accounts or relying on alternative authentication means, which degrades the user experience, requires administrative time to solve, encourages the bypassing of security systems (to avoid the potential of a degraded user experience), and wastes computing resources. By providing administrators with the ability to distinguish between brute force attacks and benign errors, the present disclosure address a computer-centric problem and improves the efficiency and reliability of the systems themselves that are involved in the granting and receiving of authorization.

Messages carrying login requests, as a good security practice, should not contain a password (including text, biometric scans, voice print data, and other access-granting data) in plaintext, but instead will normally carry the password in an encrypted format. A security device that monitors network traffic may be used to determine whether a series of login attempts change the passwords between attempts, and thus represent a malicious attack, or maintain the password tried between attempts, and thus represent a benign error. For security and maintenance purposes, the security device does not need to know the active password (which a user may periodically change), nor does it need to attempt to connect to a dummy or honeypot network. Instead, various offline brute force attacks are applied by the security device to the messages comprising the series of login attempts to determine whether the password data change between attempts. The security device may rely on vulnerabilities in the authentication protocol to learn about the passwords being used in the login attempts (e.g., length, partial composition, full composition), or may rely on the attack scheme itself and the methods used by malicious parties to carry out an online brute force attack, and thereby determine whether the passwords in the attempts change (indicating malicious intent) or remain constant (indicating benign intent), without needing to know the actual password for the account under potential attack.

FIG. 1 illustrates an example environment 100 in which authorization requests are handled by a system from various requesting devices. As illustrated, one or more authorization seeking devices (ASD) 110 attempt to gain access to accounts hosted by the system. The ASD 110 connect to the system via a gateway 120, which is in communication with the authentication server 130, which handles the authorization or rejection of a login attempt, and a passive security device (PSD) 140, which monitors the authorization traffic between the ASD 110 and the authentication server 130 to determine whether the traffic indicates a brute force attack or a benign error. Although not illustrated, one of skill in the art will appreciate that various servers and intermediaries in a network may lie between the ASD 110 and the gateway 120 to route the message between the user and the system. As will also be appreciated, although some components of the example environment 100 are illustrated singly, in various aspects multiple copies of those components may be deployed, for example, for load balancing purposes, redundancy, or offering multiple services.

The ASD 110 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, and 6B. In various aspects, the ASD 110 are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may control an ASD 110 directly or via a malicious program (e.g., a virus) over a network as part of a "bot-net" to perform the brute force attack from a plurality of ASD 110, which may be done without the knowledge or consent of the devices' owners. In another example, an ASD 110 may be the computing devices used by a legitimate user seeking to access an account, which may make one or more attempts to access the account.

The gateway 120 is a hardware device, such as a network switch, or a software service that links the ASD 110 from the external network (e.g., the Internet) to the authentication server 130 over the internal network (e.g., an intranet). In various aspects, the gateway device 120 may provide a firewall and may regulate the flow of communications traffic into and out of the local network. The gateway 120 forwards messages to the authentication server 130 from the ASD 110 (as well as other devices on the internal network) and may mirror ports so that messages destined for the authentication server 130 are also forwarded to the PSD 140. The gateway 120 also forwards messages from the authentication server 130 to the ASD 110.

The authentication server 130 receives login requests from the ASD 110 and determines whether to grant access to accounts served by the network. The authentication server 130 may use various authentication protocols including, but not limited to PAP (Password Authentication Protocol), CHAP (Challenge-Handshake Authentication Protocol), EAP (Extensible Authentication Protocol), Kerberos, or an AAA (Authentication, Authorization, Accounting) architecture protocol, to allow a user access to one or more systems within a network. An example interaction according to an authentication protocol is discussed in greater detail in regard to FIG. 2. Depending on the standards used, the number of protected systems in the network, and user account settings, the successful presentation of authentication parameters will grant the ASD 110 access to one or more systems safeguarded by the authentication server 130 and at an appropriate permissions level for the associated user.

The PSD 140 monitors traffic over the gateway 120 destined for the authentication server 130 to determine whether the communications represent a brute force attack or a benign login error. In some aspects, the PSD 140 is operated on a separate device with unique MAC and IP addresses from the other devices in the network and receives copies of messages that are forwarded to the authentication server 130 from the gateway 120 via the Remote Network Monitoring (RMON) or Switch Monitoring (SMON) specifications, port mirroring, or similar forwarding scheme. In other aspects, the PSD 140 acts as a device that intercepts all network traffic bound for the authentication server 130 (either with the same MAC and IP address or unique addresses) and forwards the communications to the authentication server 130 or passively taps and listens to the transmission medium on which the communications are sent to the authentication server 130. In yet other aspects, the PSD 140 is operated as a virtual machine or process on the hardware device that provides the application server 130, and may thereby passively share communications received at the device addressed to the application server 130.

In various aspects, the PSD 140 employs traffic speed and volume thresholds as a first check as to whether the communications represent a potential brute force attack or benign error compared to human initiated login attempts. For example, a user may attempt to manually log into the authentication server 130 and may be successful on a second attempt, and the PSD 140 will not attempt to determine whether the attempts were a brute force attack based on the low number of attempts. Similarly, the lower speed at which a human using a single device may attempt successive logins compared to automated login attempts using one or more ASD 110 can be used to screen which series of attempts are subject to a determination of whether the attempts were part of a brute force attack. The exact values for a number of attempts and the time between attempts may vary in different implementations and may be modified by an administrator of a system.

Figure 3:
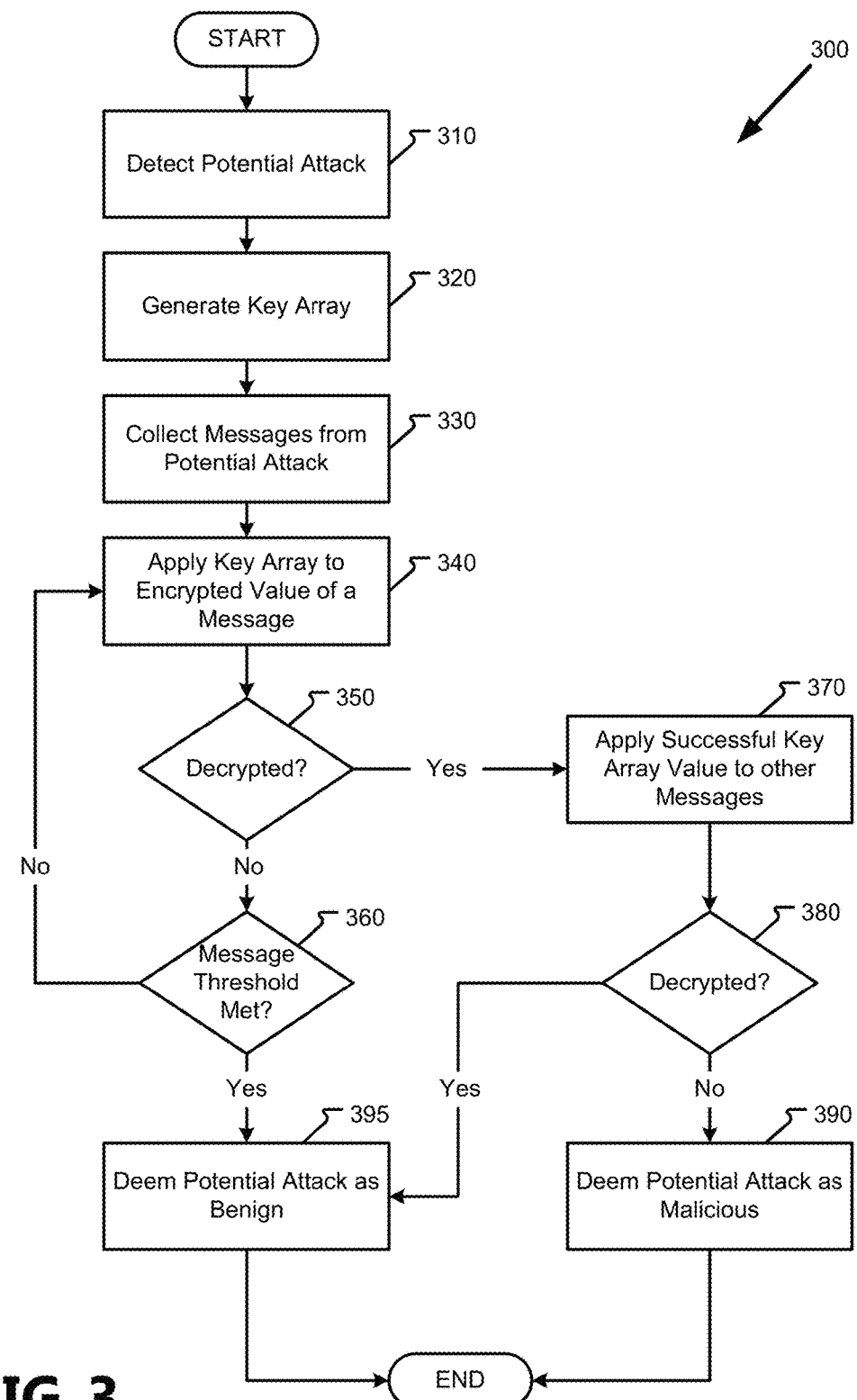
FIG. 3 is a flowchart showing general stages involved in an example method for distinguishing brute force attacks from benign errors in accessing a system when no known vulnerability in message security is applied.
Figure 4:
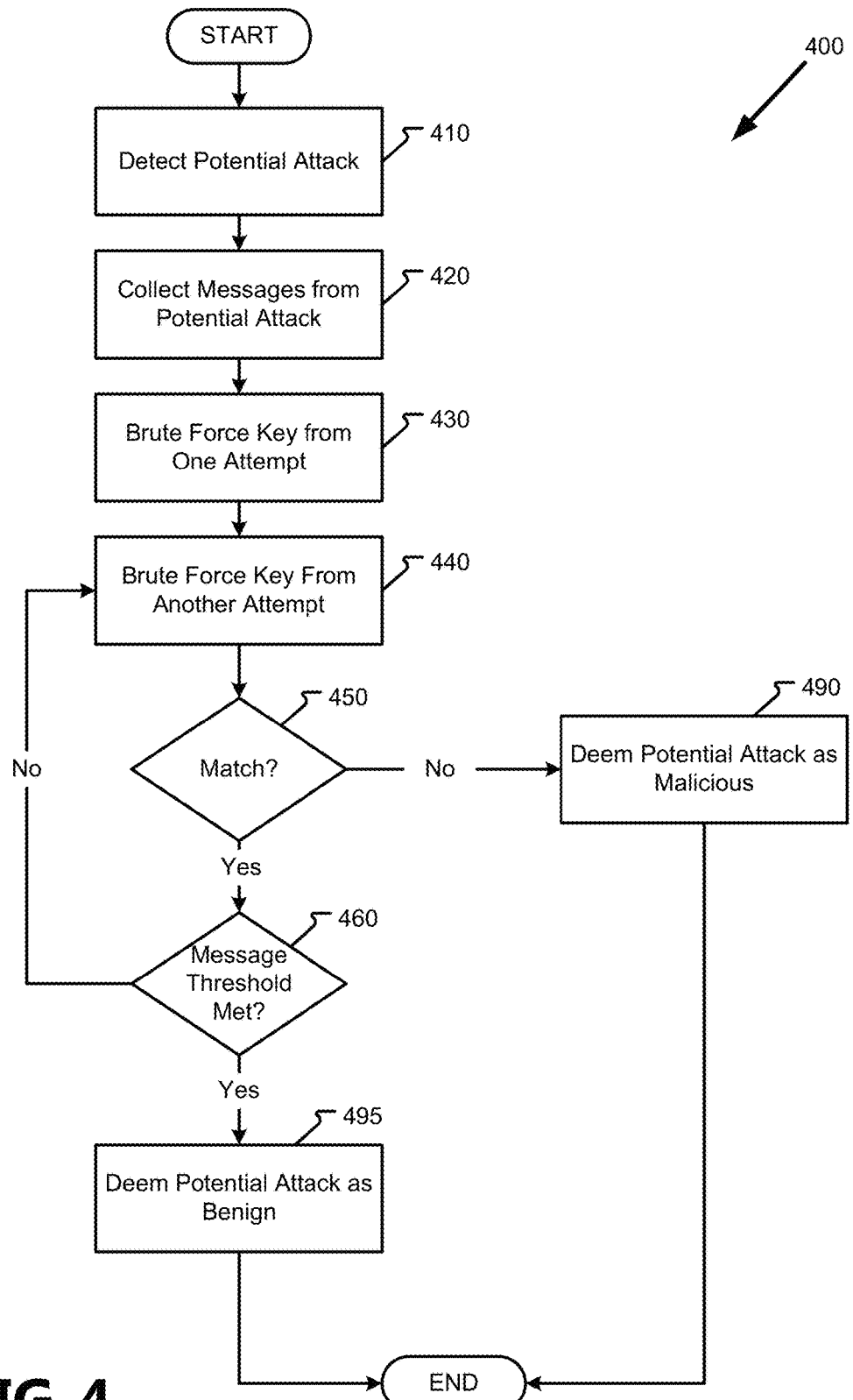
FIG. 4 is a flowchart showing general stages involved in an example method for distinguishing brute force attacks from benign errors in accessing a system when a known vulnerability in message security is applied.

The PSD 140 will perform one or more of the methods discussed in greater detail in regard to FIGS. 3 and 4 to determine whether a series of login attempts constitute an attack or an error, and will communicate the determination to the authentication server 130 to either lock the account or leave the account unlocked (or remove an existing lock).

Figure 2:
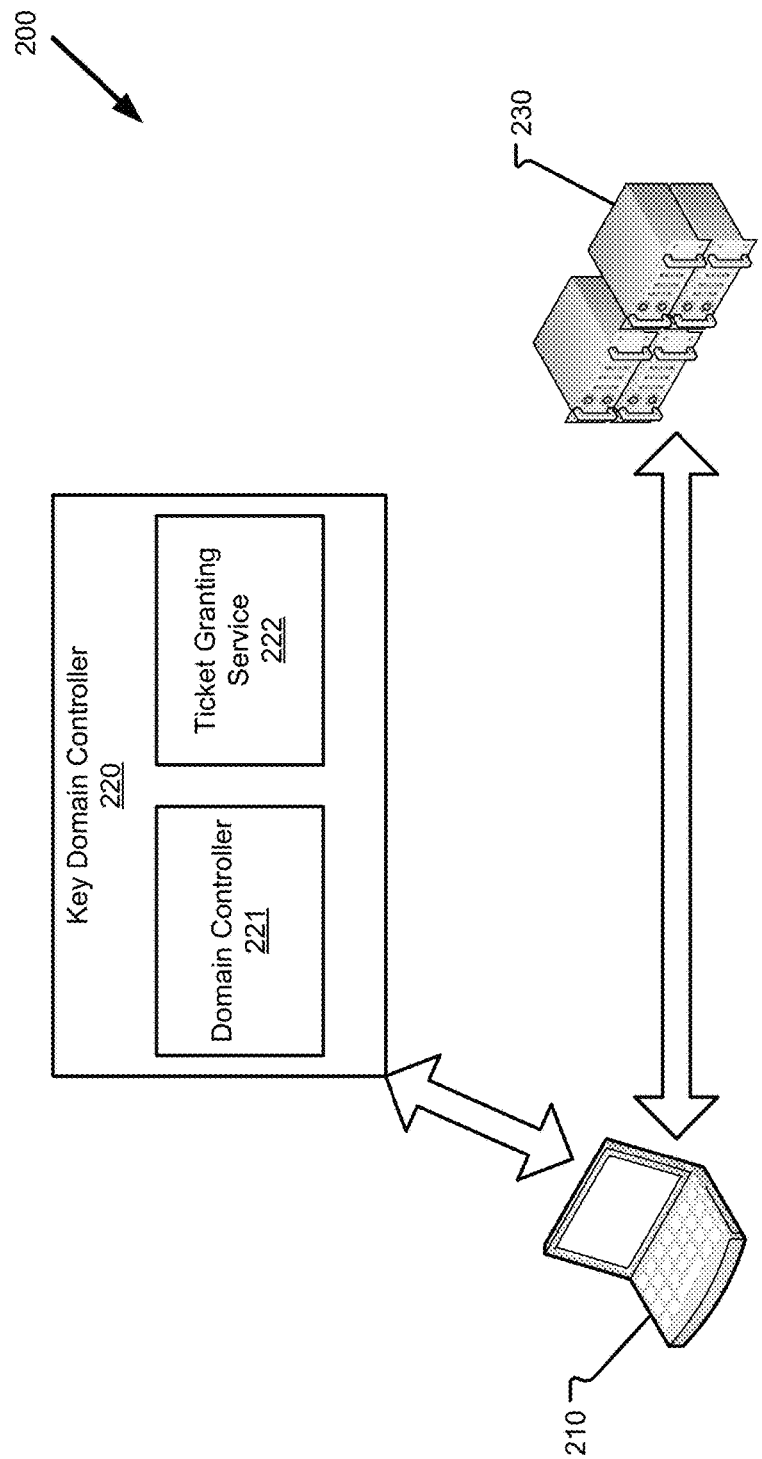
FIG. 2 illustrates an example authentication protocol execution.

FIG. 2 illustrates an example authentication protocol execution 200. Various authentication protocols may allow a Single Sign On (SSO) experience, where users actively authentication (i.e., provide a password) only once even though accessing multiple services or accessing a single service via different sessions (e.g., closing and reopening a program used to access the service), or may require reauthentication each time the user attempts to access the service.

The Kerberos protocol, for instance, allows an SSO experience, where a user supplies a domain name, account name, and a password to access a local computing device 210 (which may also be an ASD 110) and subsequently one or more network services 230. The computing device 210 will authenticate the credentials supplied by the user with a Key Domain Controller (KDC) 220 by sending a timestamp (of the current time of the authentication request) to the KDC 220 that is encrypted with a key derived from the user's password. The KDC 220 will verify the user's identity by decrypting the message with its copy of the user's password-derived key, stored on the authentication server 130, and verifying that the timestamp is relevant (e.g., the unencrypted time is possible, given potential network latency, to match a time of a login request). If the timestamp is relevant, the KDC 220 will transmit a Ticket Granting Ticket (TGT) to the computing device 210, which is an identifier that enables the computing device 210 to request access to network services 230 without having to re-supply the user's credentials (e.g., domain name, account name, password).

Once a TGT has been granted to the user on the computing device 210, and until the TGT expires, each time the computing device 210 attempts to access a network service 230, it will identify itself to a domain controller 221 (residing in the KDC 220) with the TGT. The domain controller 221, through a ticket granting service 222, will provide the computing device with the access ticket for the particular network service 230 that the user is attempting to contact. The user will then, via the computing device 210, provide the access ticket to the network service 230. The network service 230, because the access ticket has been validated by the ticket granting service 222, will authorize the user's access and a connection between the computing device 210 and the network service 230 is established without the user needing to re-input credentials.

The NTLM (Networked LAN Management) Protocol, for instance is another authentication protocol, which uses credentials of a domain name, an account name, and a password (or a one-way hash thereof) to enable logons via a challenge/response model. Instead of sending the user's password between the computing device 210 and the network service 230 for which access is sought, the computing device 210 must perform a calculation that proves it has access to the secured credentials.

Version one of NTLM (NTLMv1) is known to have security vulnerabilities, and has mostly been replaced by other authentication protocols, such as, for example, version two of NTLM (NTLMv2). In practice, however, several systems still rely on NTLMv1 or other authentication protocols with known vulnerabilities, to enable backwards compatibility, when waiting to the resources to switch to a more secure protocol, or when no better solution is available. Consequently, many systems that malicious parties use for executing online brute force attacks will attempt to gain access to a network service 230 via a vulnerable authentication protocol.

Under NTLMv1, the network service 230 authenticates the user by sending an eight-byte random number as a challenge to the computing device 210. The computing device 210 will perform an operation using this eight-byte random number and a hash of the user's password. In various aspects, the user may also initiate a challenge to the network service 230. The user will return a 24-byte result (and optionally its own challenge) to the network service 230, which will verify whether the client has computed the correct result and should therefore be granted access to the network service 230.

In greater detail, a response to a challenge under NTLMv1 is calculated by deriving a 16-byte key from the user's password (the hash), which may be done according to the LM hash algorithm or the NT hash algorithm, which is then padded with null values to reach 21-bytes in size. The padded hash is then broken into thirds (seven-bytes), which are used to create three keys for the Data Encryption Standard (DES) algorithm. Each of the keys are then used to encrypt the challenge via DES (in electronic codebook mode), which results in three eight-byte cipher texts that are concatenated into the 24-byte response. Unfortunately, the last seven-byte key is comprised of five bytes of padding (nulls), which results in the third key comprising only two bytes of unknowns, effectively making it a two-byte key, which is significantly easier to brute force attack than a seven-byte key, which allows an attacker to learn at least a portion of the NTLM hash, namely the value of the last two bytes.

NTLMv2 builds on NTLMv1 to provide additional security and strengthen NTLMv1 to employ a 128 bit key space. NTLMv2 allows for the continued use of an existing domain controller from a previous NTLMv1 regime. NTLMv2 adds additional client challenges to a response which are hashed and transmitted to the network service 230 to grant or deny access to the user. There are no known cryptographic vulnerabilities to NTLMv2.

As will be appreciated, although the Kerberos and NTLM protocols were discussed in detail in regard to FIG. 2, other authentication protocols may be used, or variations to the presented protocols may be made. The protocols discussed in FIG. 2 are given as non-limiting examples to introduce the operations and terminologies involved in example aspects for authentication within the present disclosure. Although Kerberos and NTLMv2 are presented herein as having no known vulnerabilities, one of ordinary skill in the art will understand that new vulnerabilities may be discovered as time progresses, and several other authentication protocols may be applied in accordance with the present disclosure.

FIG. 3 is a flowchart showing general stages involved in an example method 300 for distinguishing brute force attacks from benign errors in accessing a system when no known vulnerability in message security is applied. Method 300 applies a brute force attack on the messages of a suspected brute force attack to determine whether the suspected brute force attack changes the passwords attempted, and should therefore be considered malicious. In various settings, this may be referred to as a brute force counterattack, a brute force defense, or an offline brute force on online brute force technique.

Method 300 begins at OPERATION 310 when a series of login attempts to a given account is deemed a potential online brute force attack. In various aspects, the series of attempts is deemed a potential online brute force attack when a number of attempts within a period of time exceeds an amount threshold, when a time between successive attempts falls below a timing threshold (indicating rapid attempts), when both amount and timing thresholds are satisfied, or when an account is locked or flagged to be locked according to another protection scheme. OPERATION 310 screens the series of login attempts so that not every failed login attempt is subject to brute force analysis, only those that bear the hallmarks associated with the volume and speed of attempts used in an online vertical brute force attack.

At OPERATION 320 a key array is generated. A key array is generated from one or more dictionaries of popular passwords that a malicious party may use when attempting an online vertical brute force attack on an account. In various aspects, the key array may be built in advance of the suspected attack, be built in response to the suspected attack, or be built (or added to) on-the-fly as the PSD 140 checks various messages with various potential passwords. Depending on the authorization protocol used, the keys in the key array may be passwords, a hash of the passwords, or a hash of a different value hashed according the password.

As will be understood, attackers often use dictionaries of popular or known-to-be-used passwords as a shortcut in applying a brute force attack. Rather than filling a password field with an incrementing count in binary for each attempt (e.g., 00002, 00012, 00102, 00112, etc.), the attacker will instead run through the entries in the dictionary to speed up the attack, thereby avoiding the need to check binary representation of passwords that would not be likely be in use and checking the most likely entries first. For example, a first dictionary may note that the passwords "12345" and "password" are the two most popularly used passwords, while a secondary dictionary may note that the passwords "opensesame" and "123abc" are the two most popularly used passwords, and a malicious party using the first dictionary for a vertical online brute force attack would start the attack with "12345" and then "password", but would start the attack with "opensesame" and then "123abc" if using the second dictionary.

The offline brute force attack executed by the PSD 140 may use the same dictionaries that potential attackers would use. The dictionaries used to build the key array may be periodically updated, replaced, or combined with other dictionaries, including custom dictionaries. Dictionaries used by the PSD 140 may be obtained in the same manner that malicious parties obtain dictionaries for their use (e.g., from websites hosting account names and password pairs for commercial sale to malicious parties), but may also be updated with the last used passwords of the legitimate users of the authorization server 130. For example, a dictionary of passwords that has been released to malicious parties may be used by the PSD 140 and may be augmented with the previous n passwords for each user of the system. By tracking the previous passwords, and not the active or current passwords, the PSD 140 may accelerate its determination that the login attempt is a benign error without potentially exposing or needing to know the user's current password. In another example, if the authentication server 130 requires the use of passwords with certain login criteria (e.g., at least n characters, at least one numeral character, no special characters) passwords that do not meet (or violate) these login criteria may be filtered from the dictionary to be excluded when generating the key array.

The key array chooses n entries from the dictionary (where n may be any number set by the administrator), where those n entries are deemed the most likely attempts for either a benign error or a malicious attack. Because malicious parties use dictionaries as a short cut (to try popular passwords first), the PSD 140 would run through the n most likely passwords (e.g., those most frequently used, trending entries) as indicated by the dictionary. In some aspects, it may make sense to try the user's last password first as a possible attempt, to verify that the series of logins do not originate from a user-controlled device that has not been updated to use the latest password. As will also be appreciated, the potential exposure of the user's previous password (which may be reused at a later date or used with minor modification by the user) may be deemed a security risk and would require more frequent management of the PSD 140, and the use of the users' previous password as part of a custom dictionary or key array is therefore optional.

At OPERATION 330 the messages comprising the series of login attempts are collected. In various aspects, the PSD 140 may collect all login attempts destined for the authentication server 130 for use when a login attempt series is deemed potentially malicious, or may only begin collecting and caching login attempts once the series is deemed potentially malicious according to OPERATION 310. As will be appreciated, if the PSD 140 was alerted to the potential attack after the attack began, and did not capture the initial attempts, an offset for the most popular entries from the dictionary may be applied to build the key array according to OPERATION 320. The offset may be based on the average speed of current attempts and the start time of the attack, an estimated number of attempts made before collection began, or random. The login attempts may be captured up to a set number for each account (e.g., capture n attempts), or may be continuously captured as login attempts are made. As will be appreciated, to conserve memory, the PSD 140 may periodically clear a cache of login attempts (e.g., clear the cache n minutes after the last attempt), clear the cache in response to a successful login, or overwrite login attempts after the cache has been filled to a set capacity for a given account or the system.

Proceeding to OPERATION 340, the key array is applied to the encrypted portion of a login attempt captured at OPERATION 330. The several keys comprising the key array are applied in series to each encrypted portion to try to decrypt that portion. If the portion is decrypted, as determined at DECISION 350, method 300 proceeds to OPERATION 370, otherwise method 300 proceeds to DECISION 360. A login attempt is determined to be decrypted when, according to the authentication protocol used, a logical result is produced by the attempted key. For example, when the protocol, such as Kerberos, uses an encrypted timestamp, if the decrypted version yields a dataset formatted as a timestamp that would be a potential time in which a login attempt could have been sent (e.g., accounting for network latency and differences in system clock synchronization, the decrypted timestamp correlates to a time received for the message) the message will be deemed successfully decrypted. In another aspect, if a message is suspected of being correctly decrypted, its contents may be compared to the second message's decrypted contents (from OPERATION 370) to verify that the decrypted contents are consistent with one another (e.g., timestamps fall within a given time period and progress properly, contents are the same).

At DECISION 360 it is determined whether there are any additional messages to attempt to decrypt or whether a confidence threshold is met in the determination that the attempted logins use different potential passwords (collectively, a message threshold). To illustrate, if the PSD 140 only collected one hundred login attempts, after trying all one hundred the message threshold will have been met because there are no more login attempts to try to decrypt. Alternatively, if a confidence threshold requires that up to one hundred login attempts to be tried against the key array, after trying to decrypt one hundred login attempts the message threshold will have been met because the administrator has indicated via the confidence threshold that a sufficient number of checks have been made. When the message threshold has not been met, method 300 returns to OPERATION 340 to apply the key array to the next login attempt held by the PSD 140. In various aspects, the method 300 may return to OPERATION 340 once (i.e., the confidence threshold is two), method 300 may return to OPERATION 340 multiple times, or method 300 may not return to OPERATION 340 (i.e., the confidence threshold is one). When the message threshold has been met, and none of the messages have been successfully decrypted, method 300 proceeds to DETERMINATION 390, where it is determined that the message is benign.

At OPERATION 370 a key from the key array that was deemed at DECISION 350 to have successfully decrypted an encrypted portion of a login attempt (a "first" login attempt) is used against a different login attempt from the series (a "second" login attempt). The different login attempt may be a next login attempt from the series, a previous login attempt from the series, or a login attempt at a preset position in the series or relative to the decrypted login attempt. Method 300 then proceeds to DECISION 380, which operates the same as DECISION 350, to determine whether the different login attempt was also decrypted using the same key as the initially successfully decrypted login attempt. When it is determined at DECISION 380 that the second login was not decrypted with the same key as the first login, method 300 proceeds to DETERMINATION 390, where it is determined that the potential attack is malicious. When it is determined at DECISION 380 that the second login and the first login were both decrypted with the same key, method 300 proceeds to DETERMINATION 395, where it is determined that the potential attack is benign.

As a part of DETERMINATION 390 and DETERMINATION 395, the PSD 140 will contact the authentication server 130 to lock or unlock (or leave locked or unlocked) an account in response to the determination, and method 300 may then conclude. In various aspects, after reaching DETERMINATION 390, the authentication server 130 may signal the gateway 120 to stop forwarding messages from the ASD 110 (e.g., temporarily blocking an IP address), thereby conserving internal network bandwidth and processing resources. In various aspects, after reaching DETERMINATION 395, the authentication server 130 may also contact the ASD 110 to prompt the user to enter a different password or cease sending automated login attempts, thereby conserving bandwidth and processing resources internally and externally.

FIG. 4 is a flowchart showing general stages involved in an example method 400 for distinguishing brute force attacks from benign errors in accessing a system when a known vulnerability in message security is applied. Method 400 may be applied when a vulnerability in the authentication protocol (e.g., NTLMv1) used by the authentication server 130 can reliably yield shared outputs when a key or password used remains the same between login attempts. The vulnerability may also allow parties to shortcut brute force attacks on the keys or passwords by reducing the available key space that must be checked, wherein the term "key space" is understood to refer to the set of possible valid keys for a given algorithm.

Method 400 begins at OPERATION 410 when a series of login attempts to a given account is deemed a potential online brute force attack. In various aspects, the series of attempts is deemed a potential online brute force attack when a number of attempts within a period of time exceeds an amount threshold, when a time between successive attempts falls below a timing threshold (indicating rapid attempts), when both amount and timing thresholds are satisfied, or when an account is locked or flagged to be locked according to another protection scheme. OPERATION 410 screens the series of login attempts so that not every failed login attempt is subject to brute force analysis, only those that bear the hallmarks associated with the volume and speed of attempts used in an online vertical brute force attack.

At OPERATION 420 the messages comprising the series of login attempts are collected. In various aspects, the PSD 140 may collect all login attempts destined for the authentication server 130 for use when a login attempt series is deemed a potential attack, or may only begin collecting and caching login attempts once the series is deemed a potential attack according to OPERATION 410. The login attempts may be captured up to a set number for each account (e.g., capture n attempts), or may be continuously captured as login attempts are made. As will be appreciated, to conserve memory, the PSD 140 may periodically clear a cache of login attempts (e.g., clear the cache n minutes after the last attempt), clear the cache in response to a successful login, or overwrite login attempts after the cache has been filled to a set capacity for a given account or the system.

An encrypted portion of a first message is cracked according to the known vulnerability to expose one or more unencrypted bits of the message in OPERATION 430. For example, when the authentication server 130 uses NTLMv1 as an authentication protocol, the PSD 140 may try all 28 (256) potential values for the third key segment to gain knowledge about the NTLM hash via brute force. The PSD 140 will know that it has found the correct third key segment under NTLMv1 when a DES algorithm using the potential key as the key is able to decrypt the challenge string to yield the last eight bytes of the NTLM response (i.e., DESkey (challenge string)=last eight bytes). As will be appreciated, if a different authentication protocol than NTLMv1 with a known vulnerability is used, the methodology to expose vulnerable portions of that protocol will be employed.

An encrypted portion of a second message is cracked according to the known vulnerability to expose one or more unencrypted bit of the message in OPERATION 440. The second message is attacked similarly to the first message.

At DECISION 450 it is determined whether the vulnerable bits of the keys that were brute forced match. For example, a bitwise AND comparison may be made on the vulnerable bits of the keys by a series of AND logic gates comprised of transistors, which will be aggregated via an OR logic gate comprised of transistors. When it is determined that the bits do not match, indicating that the keys used differ between attempts, method 400 proceeds to DETERMINATION 490, where it is determined that the potential attack is malicious. When it is determined that the bits do match, method 400 proceeds to DECISION 460.

At DECISION 460 it is determined whether there are any additional messages to attempt to decrypt or whether a confidence threshold is met in the determination that the attempted logins use different potential passwords (collectively, a message threshold). To illustrate, if the PSD 140 only collected one hundred login attempts, after trying all one hundred, the message threshold will have been met because there are no more login attempts to try to decrypt. Alternatively, if a confidence threshold requires that up to one hundred login attempts to be compared against one another, after trying to decrypt one hundred login attempts the message threshold will have been met because the administrator has indicated via the confidence threshold that a sufficient number of checks have been made. As will be appreciated, depending on the number of bits vulnerable in an authentication protocol, the administrator may vary the confidence threshold. For example, two different password attempts may yield the same value for a single vulnerable bit (which may be either 0 or 1), but as more password attempts are compared or as more bits are vulnerable, the probability that the vulnerable bits would be the same from different passwords will reduce, and the administrator's confidence in the passwords actually being the same will increase.

When the message threshold has not been met, method 400 returns to OPERATION 440 to brute force a different message attempt. When the message threshold has been met, method 400 proceeds to DETERMINATION 495, where it is determined that the message is benign. As will be appreciated, when method 400 returns to OPERATION 440, either of the messages that had the same exposed bits may be termed the "first" message and a different message will be termed the "second" message for the subsequent run of method 400.

As a part of DETERMINATION 490 and DETERMINATION 495, the PSD 140 will contact the authentication server 130 to lock or unlock (or leave locked or unlocked) an account to which the login requests are addressed in response to the determination, and method 400 may then conclude. In various aspects, after reaching DETERMINATION 490, the authentication server 130 may signal the gateway 120 to stop forwarding messages from the ASD 110 (e.g., temporarily blocking an IP address), thereby conserving internal network bandwidth and processing resources. In various aspects, after reaching DETERMINATION 495, the authentication server 130 may also contact the ASD 110 to prompt the user to enter a different password or cease sending automated login attempts, thereby conserving bandwidth and processing resources.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
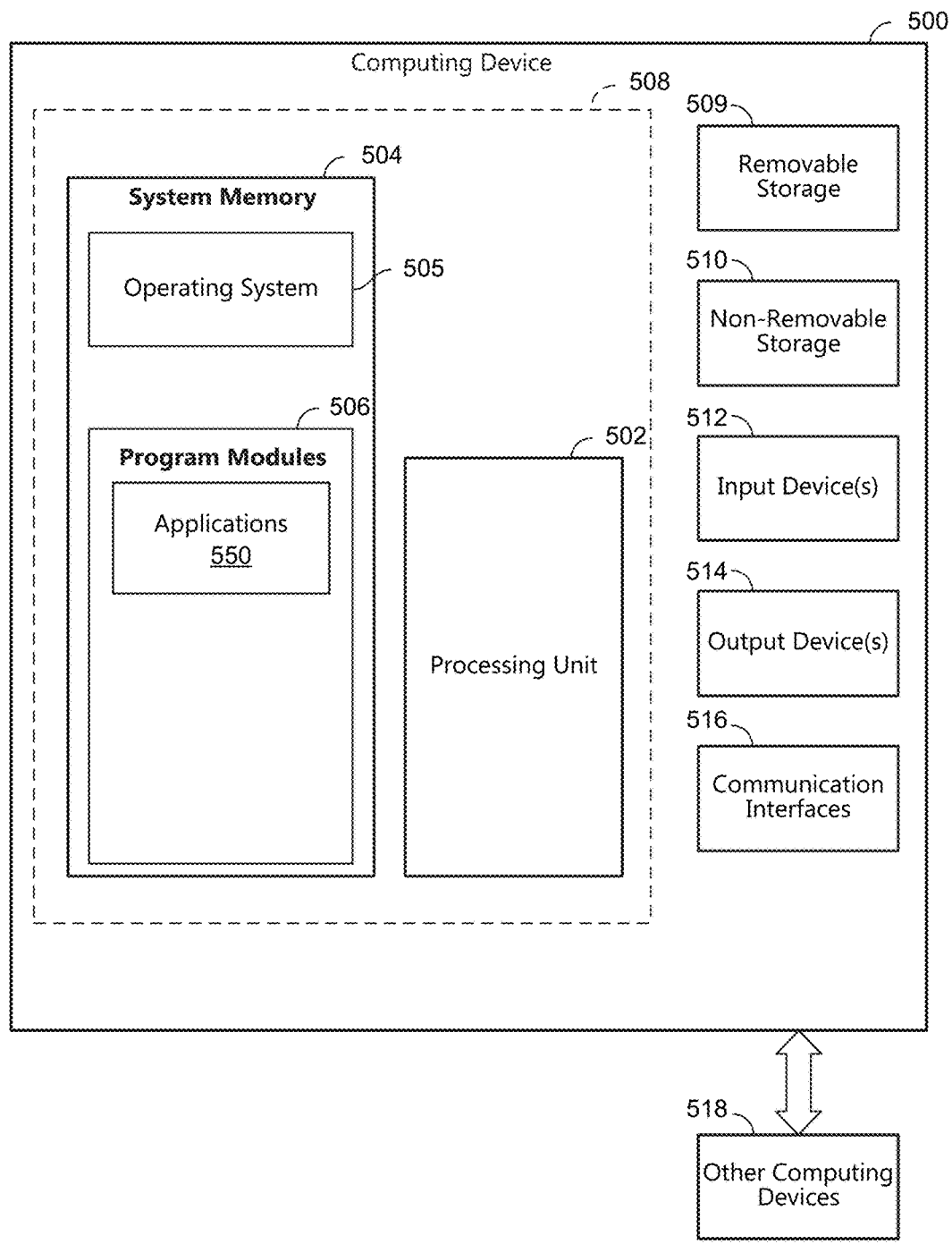
FIG. 5 is a block diagram illustrating physical components of a computing device with which examples may be practiced.
Figure 6A:
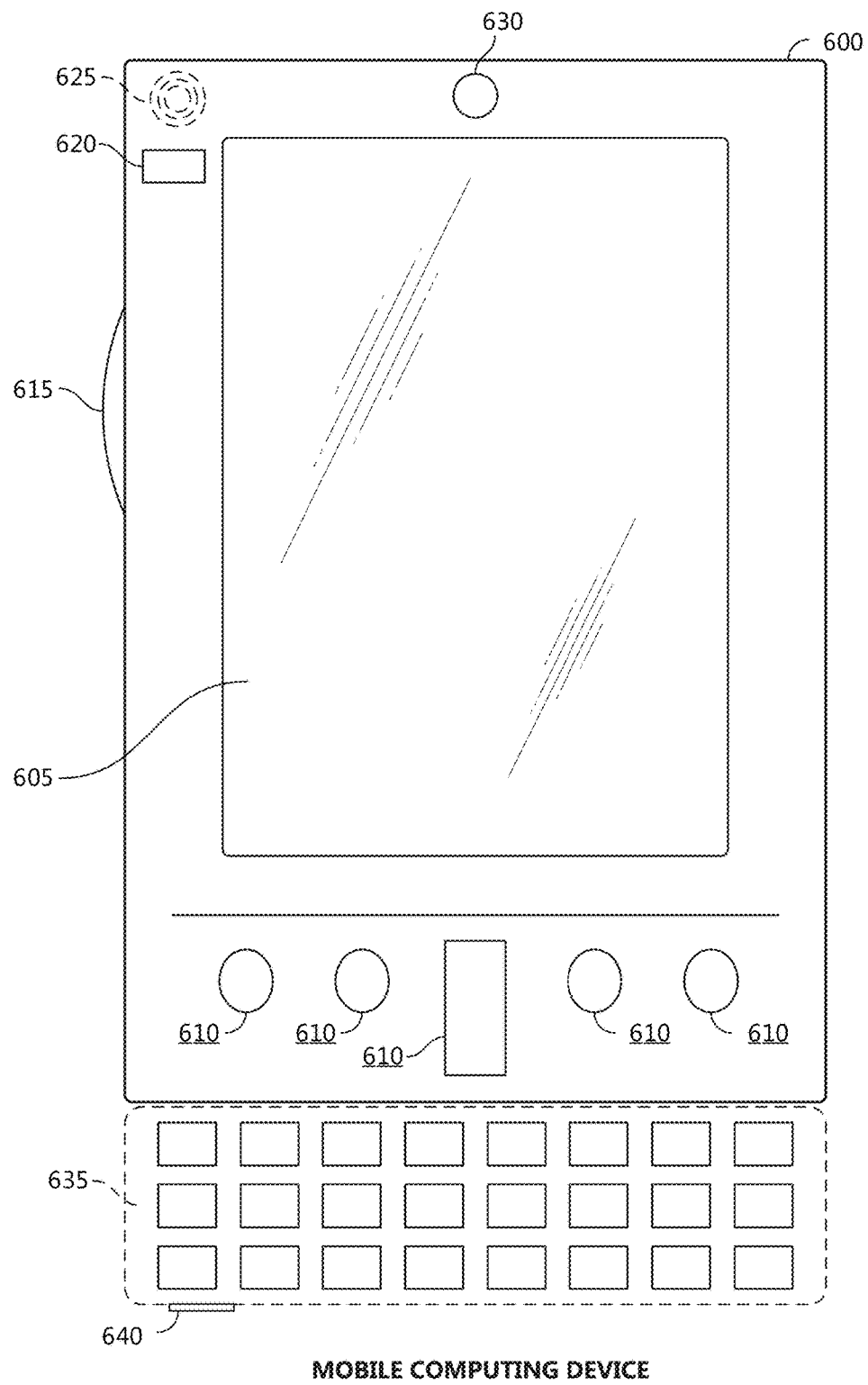
FIGS. 6A and 6B are block diagrams of a mobile computing device with which aspects may be practiced.
Figure 6B:
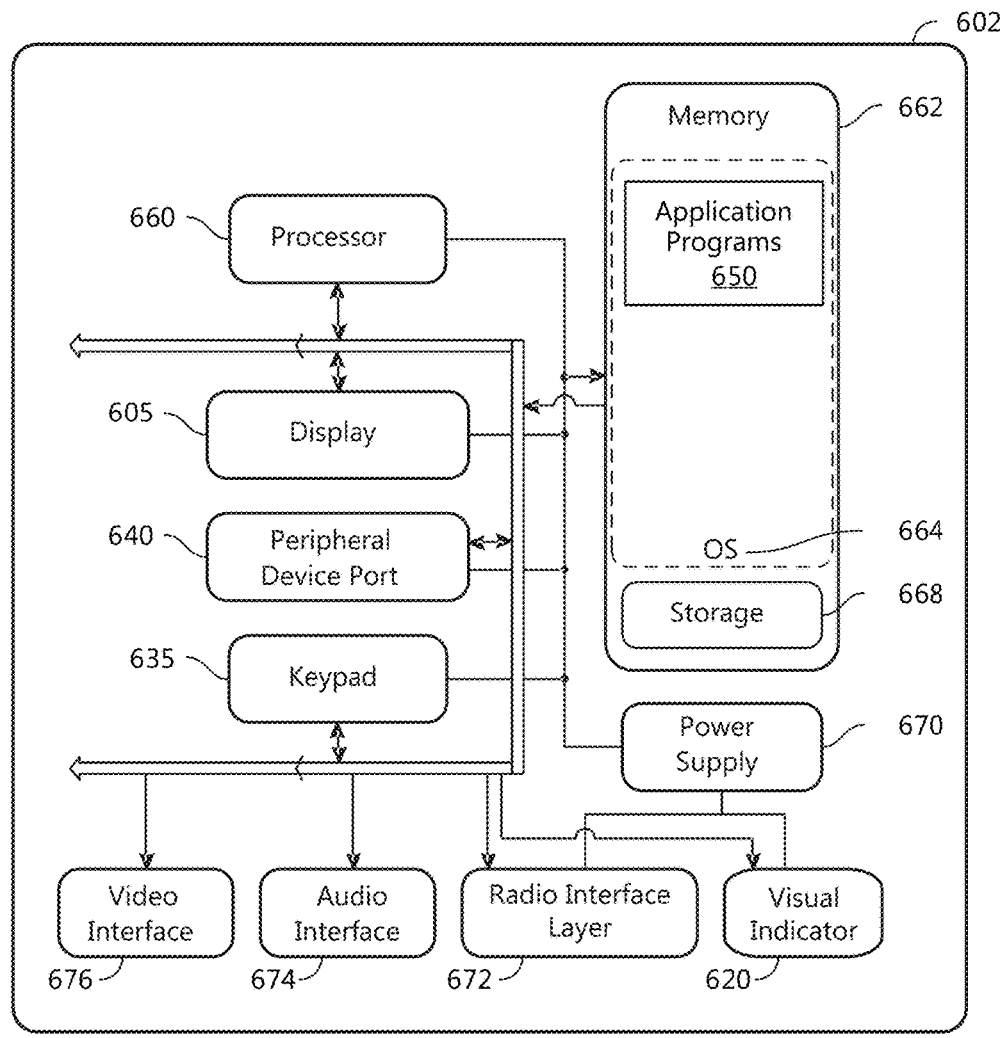

FIGS. 5, 6A, and 6B and the associated descriptions provide a discussion of a variety of operating environments in which examples are practiced. However, the devices and systems illustrated and discussed with respect to FIGS. 5, 6A, and 6B are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes a PSD controller to enable a software application 550 to employ the teachings of the present disclosure via stored instructions. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., the email clients) perform processes including, but not limited to, one or more of the stages of the methods 300 and 400 illustrated in FIGS. 3 and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication interfaces 516 allowing communications with other computing devices 518. Examples of suitable communication interfaces 516 include, but are not limited to: radio frequency (RF) transmitter, receiver, and/or transceiver circuitry; universal serial bus (USB) ports, parallel and/or serial ports, and Ethernet ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced or may be used as an ASD 110. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, client used to access the network is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for distinguishing malicious brute force attacks from benign errors in a series of login attempts, comprising:
   collecting a plurality of messages from the series of login attempts, wherein each message of the plurality of messages includes an encrypted portion;
   generating a key array comprising a plurality of keys derived from a password dictionary;
   applying the keys of the key array to the encrypted portion of a message from the plurality of messages;
   determining whether the encrypted portion of the message was decrypted to provide a decrypted message and noting a given key of the key array used to decrypt the message;
   when it is determined that the encrypted portion of the message was not decrypted with any of the keys of the key array:
      applying the keys of the key array to a subsequent message;
      determining whether the encrypted portion of the subsequent message was decrypted to provide the decrypted message and noting the given key of the key array used to decrypt the subsequent message; and
   when the decrypted message has been provided:
      applying the given key to the encrypted portion of a different message from the plurality of messages;
      determining whether the encrypted portion of the different message was decrypted with the given key of the key array;
      when it is determined that the different message was decrypted with the given key, deeming the series of login attempts as benign; and
      when it is determined that the different message was not decrypted with the given key, deeming the series of login attempts as malicious.

2. The method of claim 1, wherein prior to applying the keys of the key array to the encrypted portion of the message, determining that the series of login attempts is a potential attack based on a time between attempts and a volume of attempts comprising the series of login attempts.

3. The method of claim 1, when it is determined that the encrypted portion of the message was not decrypted with any of the keys of the key array, further comprising:
   determining whether a message threshold has been met by a number of messages to which the key array has been applied; and
   when the number of messages meets the message threshold, deeming the series of login attempts as malicious.

4. The method of claim 3, wherein the message threshold is equal to a number of messages comprising the series of login attempts collected.

5. The method of claim 3, wherein the message threshold is set at one, wherein the series of login attempts is deemed malicious without applying the keys of the key array to the subsequent message.

6. The method of claim 1, wherein the password dictionary includes a last valid password for an account to generate a first key of the key array.

7. The method of claim 1, wherein passwords comprising the password dictionary are filtered to exclude passwords from the password dictionary that violate login criteria.

8. The method of claim 1, further comprising:
   when the series of login attempts are deemed as malicious, prompting an authentication server to lock an account to which the series of login attempts are addressed.

9. The method of claim 1, further comprising:
   when the series of login attempts are deemed as benign, prompting an authentication server to unlock an account to which the series of login attempts are addressed.

10. The method of claim 1, further comprising:
    when the series of login attempts are deemed as benign, prompting a remote user to supply a different password.

11. A passive security device for distinguishing malicious brute force attacks from benign errors in a series of login attempts, comprising:
    a communication interface;
    a processor; and
    a memory including instructions that when executed by the processor are operable to cause the passive security device to:
    receive, via the communication interface, login attempts comprising the series of login attempts addressed to an authentication server, wherein the login attempts identify a given account to which an access seeking device is attempting to gain access;
    determine, based on a number of login attempts and a speed at which the login attempts are made, whether the series of login attempts is potentially attacking the given account;
    when it is determined that the series of login attempts is potentially attacking the given account, the instructions are further operable to cause the passive security device to:
    determine a first key used to encrypt the encrypted portion of a first message;
    determine a subsequent key used to encrypt the encrypted portion of a subsequent message;
    compare the first key to the subsequent key to determine whether the first key and the subsequent key are equal; and
    when it is determined that the first key and the subsequent key are not equal, deem the series of login attempts as malicious and transmit a signal to lock an account to which the series of login attempts is addressed.

12. The passive security device of claim 11, wherein the passive security device receives the login attempts addressed to the authentication server via port mirroring.

13. The passive security device of claim 11, further comprising, when it is determined the that the first key and the subsequent key are equal, the instructions are further operable to cause the passive security device to:
    determine whether a confidence threshold, indicating a number of subsequent keys to compare against the first key, has been met;
    when it is determined that the confidence threshold has not been met, select a new message as the subsequent message and determine an associated key as the subsequent key for comparison with the first key; and
    when it is determined that the confidence threshold has been met, deem the series of login attempts as benign and transmit a signal to keep the account to which the series of login messages are addressed unlocked.

14. The passive security device of claim 11, wherein the instructions are further operable to cause the passive security device to:
    wherein to determine the first key used to encrypt the encrypted portion of the first message the passive security device applies a first brute force counterattack to determine a value for the first key;
wherein the first brute force counterattack uses potential keys from a key space of an authorization protocol against the encrypted portion of the first message;
wherein the value for the first key is assigned from a given potential key based on a vulnerability in the authorization protocol being met when the vulnerability and the given potential key are applied to the encrypted portion of the first message;
wherein to determine the subsequent key used to encrypt the encrypted portion of the subsequent message the passive security device applies a subsequent brute force counterattack to determine a value for the subsequent key;
wherein the subsequent brute force counterattack uses the potential keys from the key space of the authorization protocol against the encrypted portion of the subsequent message;
wherein the value for the subsequent key is assigned from a particular potential key based on the vulnerability in the authorization protocol being met when the vulnerability and the particular potential key are applied to the encrypted portion of the subsequent message.

15. The passive security device of claim 11, wherein to determine the first key, the passive security device applies a dictionary attack on the encrypted portion of the first message; and
wherein to determine whether the first key and the subsequent key are equal, the instructions are further operable to cause the passive security device to:
apply the first key to the encrypted portion of the subsequent message;
determine whether first key decrypted the encrypted portion of the subsequent message; and
when it is determined that the first key decrypted the encrypted portion of the subsequent message, determine that the subsequent key is equal to the first key.

16. A method for distinguishing malicious brute force attacks from benign errors in a series of login attempts, comprising:
collecting a plurality of messages from the series of login attempts, wherein each message of the plurality of messages includes an encrypted portion;
determining a first key used to encrypt the encrypted portion of a first message;
determining a subsequent key used to encrypt the encrypted portion of a subsequent message;
comparing the first key to the subsequent key to determine whether the first key and the subsequent key are equal; and
when it is determined that the first key and the subsequent key are not equal, deeming the series of login attempts as malicious and transmitting a signal to lock an account to which the series of login messages are addressed.

17. The method of claim 16, further comprising, when it is determined the that the first key and the subsequent key are equal:
determining whether a confidence threshold, indicating a number of subsequent keys to compare against the first key, has been met;
when it is determined that the confidence threshold has not been met, selecting a new message as the subsequent message and determining an associated key as the subsequent key for comparison with the first key; and
when it is determined that the confidence threshold has been met, deeming the series of login attempts as benign and transmitting a signal to keep the account to which the series of login messages are addressed unlocked.

18. The method of claim 16, further comprising:
wherein determining the first key used to encrypt the encrypted portion of the first message is achieved by applying a first brute force counterattack to determine a value for the first key;
wherein the first brute force counterattack uses potential keys from a key space of an authorization protocol against the encrypted portion of the first message;
wherein the value for the first key is assigned from a given potential key based on a vulnerability in the authorization protocol being met when the vulnerability and the given potential key are applied to the encrypted portion of the first message;
wherein determining the subsequent key used to encrypt the encrypted portion of the subsequent message is achieved by applying a subsequent brute force counterattack to determine a value for the subsequent key;
wherein the subsequent brute force counterattack uses the potential keys from the key space of the authorization protocol against the encrypted portion of the subsequent message;
wherein the value for the subsequent key is assigned from a particular potential key based on the vulnerability in the authorization protocol being met when the vulnerability and the particular potential key are applied to the encrypted portion of the subsequent message.

19. The method of claim 18, wherein the vulnerability reduces a number of potential keys in the key space.

20. The method of claim 16, wherein determining the first key is achieved by a dictionary attack on the encrypted portion of the first message; and
wherein determining whether the first key and the subsequent key are equal further comprises:
applying the first key to the encrypted portion of the subsequent message;
determining whether first key decrypted the encrypted portion of the subsequent message; and
when it is determined that the first key decrypted the encrypted portion of the subsequent message, determining that the subsequent key is equal to the first key.

* * * * *